United States Patent [19]
Raudys et al.

[11] Patent Number: 5,087,463
[45] Date of Patent: Feb. 11, 1992

[54] METHOD AND APPARTUS FOR VOIDING FOOD PRODUCT FROM THE TAIL OF A STUFFED CASING PRODUCT

[75] Inventors: Vytas A. Raudys, Chicago; Reid A. Kennedy, Willow Brook, both of Ill.

[73] Assignee: Viskase Corporation, Chicago, Ill.

[21] Appl. No.: 477,403

[22] Filed: Feb. 9, 1990

[51] Int. Cl.⁵ .............................................. A22C 11/02
[52] U.S. Cl. ...................................... 426/138; 53/576; 426/105; 452/35; 452/46; 452/48
[58] Field of Search .............. 426/412, 413, 414, 105, 426/138, 140, 410; 17/33, 34, 35, 49; 53/138 A, 550, 575, 576, 577, 574; 452/35, 48, 46

[56] References Cited

U.S. PATENT DOCUMENTS

| | | | |
|---|---|---|---|
| Re. 30,390 | 9/1980 | Kupcikevicius et al. | 17/49 |
| 3,748,690 | 7/1973 | Niedecker | 17/33 |
| 4,438,545 | 5/1984 | Kupcikevicius et al. | 17/34 |
| 4,672,793 | 6/1987 | Terlizzi, Jr. et al. | 426/414 |
| 4,675,945 | 6/1987 | Evans et al. | 17/33 |
| 4,750,239 | 6/1988 | Niedecker | 17/34 |
| 4,769,332 | 1/1989 | Stanley | 17/34 |

Primary Examiner—Donald E. Czaja
Assistant Examiner—Anthony Weier
Attorney, Agent, or Firm—Roger Aceto

[57] ABSTRACT

Method and apparatus for voiding food product from the tail of a stuffed casing including a single pair of voider gates which close after the stuffed casing is gathered and a first closure is applied. The closed voider gates move to progressively constrict casing extending from the closure to strip any food product therein back to the stuffing horn and then a second closure is affixed to the constricted and stripped casing.

10 Claims, 4 Drawing Sheets

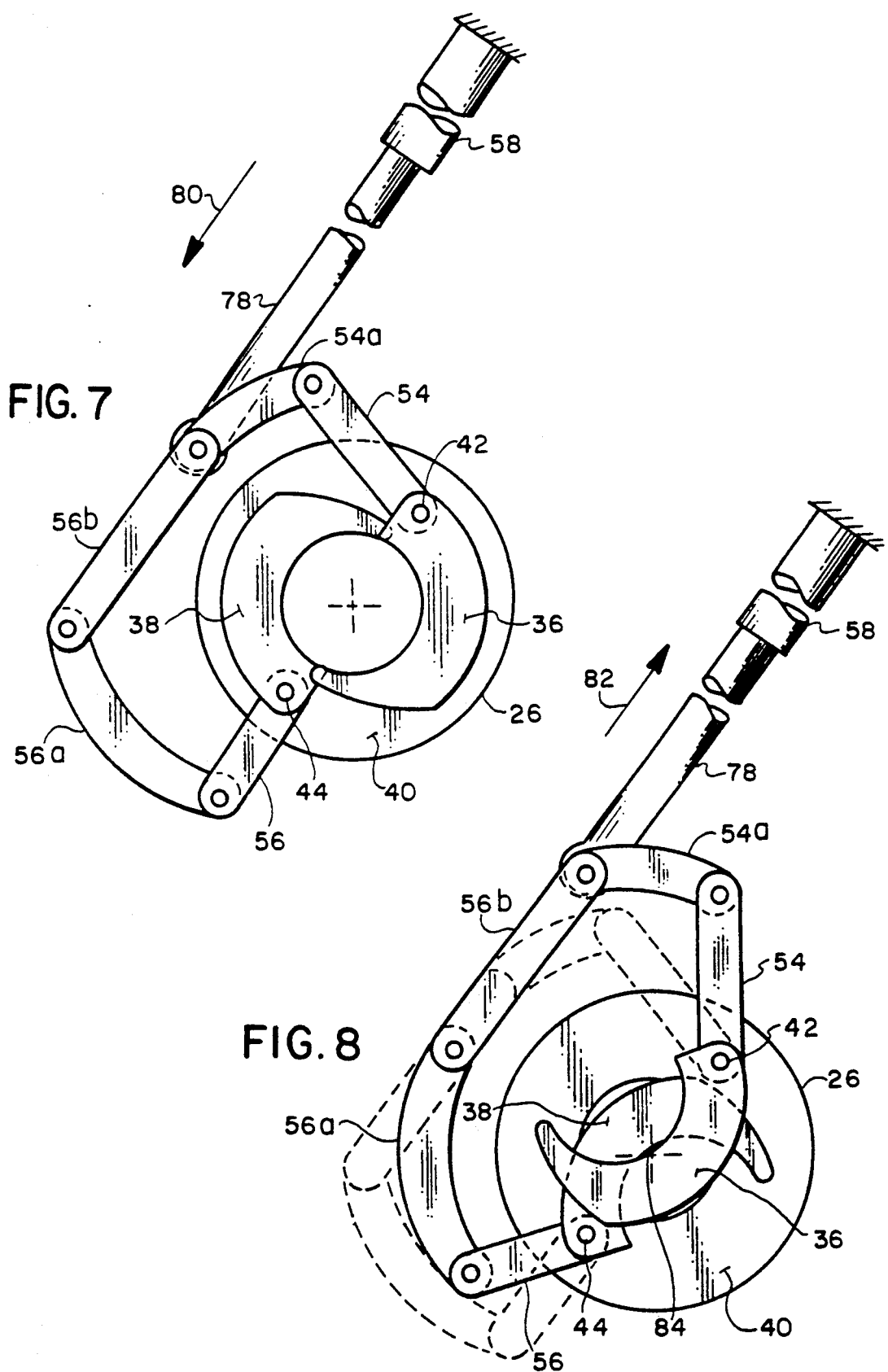

5,087,463

METHOD AND APPARTUS FOR VOIDING FOOD PRODUCT FROM THE TAIL OF A STUFFED CASING PRODUCT

TECHNICAL FIELD

The present invention relates to a stuffing method and apparatus and more particularly to a method and apparatus for voiding food product from the tail of casing at the closed end of the stuffed product.

BACKGROUND OF THE INVENTION

It is common to form the ends of large stuffed products such as bologna and the like by gathering the stuffed casing towards the longitudinal axis of the stuffed product and then applying two longitudinally spaced closures, usually metal clips, to the gathered casing. A first closure forms the trailing end of one stuffed product and the second closure forms the leading end of a succeeding stuffed product. Between the two closures is a gathered section of casing which is severed to separate the stuffed products. The gathered casing between the closures is sometimes referred to as a "tail".

It is not uncommon for some portion of food product to become trapped in the casing tail. This is objectionable for several reasons. It wastes food product which otherwise could be used to make a stuffed product. Also, when the casing tail is severed, the food product in the casing tail is exposed. This is unsightly and is a source of contamination.

Various means are employed to rid the casing tail of food product. One common practice is to use a clipper assembly which has two longitudinally spaced clipping devices. The assembly closes about the stuffed casing and the clipping devices apply the two closures. Closing the assembly about the stuffed casing squeezes the volume of food product in the longitudinal section of stuffed casing between the two clipping devices. Some of the food product which is squeezed is displaced ahead into the stuffed casing and some is displaced back to the stuffing horn. This leaves a constricted length of casing about which the two longitudinally spaced closures are applied.

The squeezing action does not necessarily displace all the food product from the squeezed section of stuffed casing and it is possible for some portion of food product to remain in the casing tail. Also, the displacement of a volume of food product ahead into the stuffed casing may over stuff the casing causing either the casing or the closure to fail.

Another common practice for removing food product from the casing tail is to close two pairs of thin plates or voider gates about the stuffed casing. The two pairs of voider gates are positioned close together to minimize the volume of food product which is displaced when the gates close about the stuffed casing. After closing, the two pairs of voider gates move axially apart to displace food product and create a relatively food-free constricted section of casing. Displacement of food product either ahead into the stuffed product or back to the stuffing horn is controlled by the relative movement of one or both of the pairs of gates.

The gates move apart a distance sufficient to accommodate the clipper assembly between them. The closed gates hold the constricted section of casing while the clipper assembly closes about the constricted casing to apply the closures.

Voider gates used in this fashion are forced against the stuffed casing. Since the gates are relatively thin, forcing them against the stuffed casing may damage the casing directly beneath the gates or the gates may even cut through the casing thereby releasing the food product.

OBJECT OF THE INVENTION

One object of the present invention is to provide a method and apparatus for voiding food product from a casing tail using a single pair of voider gates.

Another object is to provide a method and apparatus for voiding food product from a casing tail using a single pair of voider gates which do not press against a stuffed casing when they close.

A further object is to provide a method and apparatus for voiding food product from a section of casing after a first closure has been applied to the casing.

SUMMARY OF THE INVENTION

The method of gathering and closing stuffed casing according to the present invention is characterized by the steps of a) providing a casing supply on a stuffing horn, said casing supply having a closed end;

b) discharging a flowable food product under pressure from the discharge end of the stuffing horn into the casing thereby stuffing said casing and moving the closed end away from the stuffing horn;

c) stopping the flow of food product after a predetermined length of casing has been stuffed;

d) gathering the stuffed casing towards its longitudinal axis at a location adjacent the stuffing horn discharge end and applying a first closure to the gathered casing;

e) advancing the stuffed casing in the direction of its longitudinal axis to space the first closure away from the stuffing horn discharge end thereby providing a casing tail which extends from the first closure to the stuffing horn and in which is present some portion of the food product;

f) progressively axially constricting the casing tail over its length from the first closure to the stuffing horn discharge thereby axially stripping the portion of food product from the casing tail back to the stuffing horn; and g) applying a second closure to the constricted casing tail at a position longitudinally spaced from the first closure.

The apparatus for gathering and closing stuffed casing according to the present invention is characterized by a) a stuffing horn arranged along a stuffing axis for stuffing a food product into casing disposed on the stuffing horn;

b) a first carriage arranged for movement along a path of travel parallel to the stuffing axis;

c) clipper means fixed to said first carriage including:
 (i) a first clipper mechanism closable toward the stuffing axis for gathering the casing to the stuffing axis and applying a first closure to the gathered casing; and
 (ii) a second clipper mechanism spaced longitudinally from said first mechanism in an aft direction along said stuffing axis;

d) a first drive means operable after the first clipper mechanism is closed about the stuffed casing for advancing said carriage in a forward direction away from the discharge end of the stuffing horn to locate said first closure spaced forward of said stuffing horn and provide a food product containing casing tail extending from said first closure to said stuffing horn;

e) a voider assembly movable with respect to said carriage along a path of travel parallel to said stuffing axis, said voider assembly including opposed gates disposed transverse the stuffing axis which are closable about the casing tail adjacent said first closure;

f) said voider assembly including drive means operable, after closing said opposed gates and advancing said carriage, to move said voider assembly in an aft direction toward said discharge end and away from said carriage to a position between said second clipper mechanism and said stuffing horn discharge end so that said closed gates progressively constrict the casing tail over its length and strip the food product contents of said casing tail back to said stuffing horn; and g) said second clipper mechanism being operable to apply a second closure to said constricted food product-stripped casing tail.

DESCRIPTION OF THE DRAWINGS

FIG. 7 is a front view taken along lines 7—7 of FIG. 1 with portions of the apparatus removed for clarity and showing the voider gates of the present invention in an open position; and FIG. 8 is a view similar to FIG. 7 only showing the voider gates in a closed position.

DETAILED DESCRIPTION OF THE INVENTION

Figure 1:
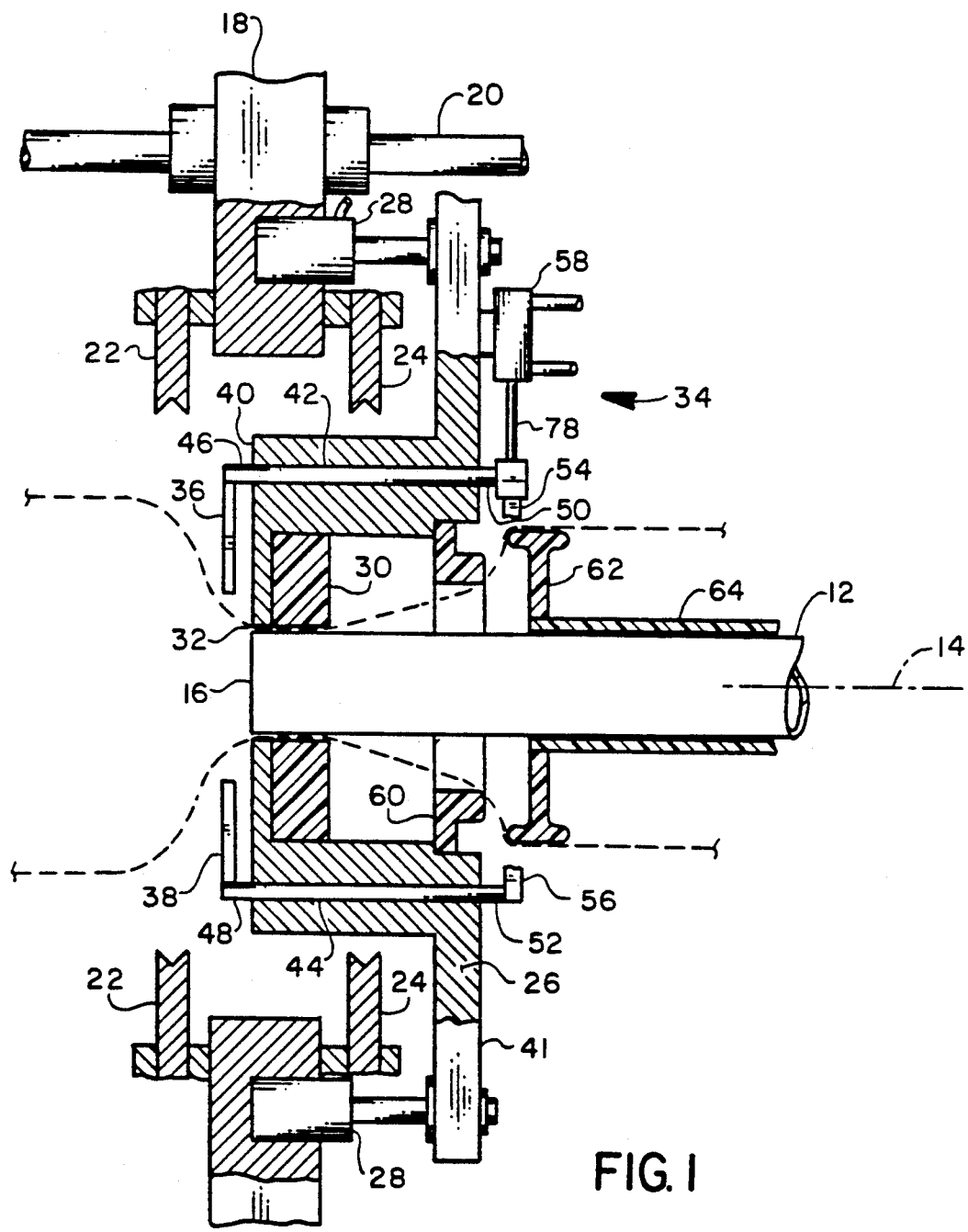
FIG. 1 is an elevation view, partly broken away and in section showing a portion of a stuffing apparatus incorporating the voider assembly of the present invention.

Referring to the drawings, FIG. 1 shows a portion of a stuffing horn 12 arranged along a stuffing axis 14. Disposed adjacent the discharge end 16 of the stuffing horn is a clipper carriage, a portion of which is shown at 18. The clipper carriage is conventional and is slidably supported on rods 20 (only one of which is shown). The rods 20 are arranged parallel to the stuffing axis 14 so the clipper carriage is capable of longitudinal movement with respect to the stuffing horn. Longitudinal movement of the clipper carriage in a forward direction (to the left as viewed in the figures) and in an aft direction, is provided by suitable means (not shown) such as a pneumatic cylinder.

The clipper carriage 18 mounts a pair of longitudinally spaced casing gathering and clip closing devices 22, 24 which apply closures to the stuffed casing for forming the closed leading and trailing ends of a stuffed product. The clip closing devices 22, 24 (hereinafter referred to as "clippers") are conventional in operation and are described further hereinbelow.

Carried by the clipper carriage 18 is a snubber carriage 26 (hereinafter referred to as a "snubber"). The snubber 26 is longitudinally movable fore and aft with respect to the clipper carriage wherein such movement is accomplished by means of pneumatic cylinders 28. These cylinders (preferably two in number) are carried by the clipper carriage and are arranged so that movement of the snubber with respect to the clipper carriage is parallel to the stuffing axis 14.

The snubber 26 mounts an annular emulsion seal ring 30. This seal ring defines a central opening 32 having an inner circumference slightly larger than the diameter of the stuffing horn discharge end 16. The casing (shown in dotted line) passes through opening 32 and the proximity of the seal ring inner surface to the stuffing horn prevents food product from back flowing around the stuffing horn discharge end 16.

Also mounted on the snubber 26 is a voider assembly generally indicated at 34. The voider assembly includes a pair of opposed voider gates 36, 38 which are pivotally connected to a forward facing surface 40 of the snubber. The voider gates are arranged for pivoting movement in a plane transverse the stuffing axis 14 between an open position (FIGS. 1 and 7) and a closed position (FIG. 8). In the closed position, the voider gates are closed down about the stuffing axis for purposes set out hereinbelow.

The pivot support of each voider gate 36, 38 is a rod 42, 44 respectively. These rods are journaled to the snubber and extend longitudinally through to the aft facing surface 41 of the snubbing carriage. One end 46, 48 of each rod is fixed to a voider gate 36, 38 and the second end 50, 52 of each rod is fixed to a linkage 54, 56 a portion of each linkage being shown in FIG. 1. The linkage is driven by any suitable means such as a pneumatic cylinder 58 carried on the aft facing surface 41 of the snubbing carriage.

Also shown in FIG. 1 is a pressure ring 60 carried by the snubber. A sizing disc 62 is fixed to an end of a sleeve 64 slidably disposed on the stuffing horn. The pressure ring and sizing disc are conventional and form no part of the present invention. It is sufficient for purposes of the present invention merely to say that these components cooperate to insure that the casing is stuffed to the diameter recommended by the casing manufacturer.

Figure 2:
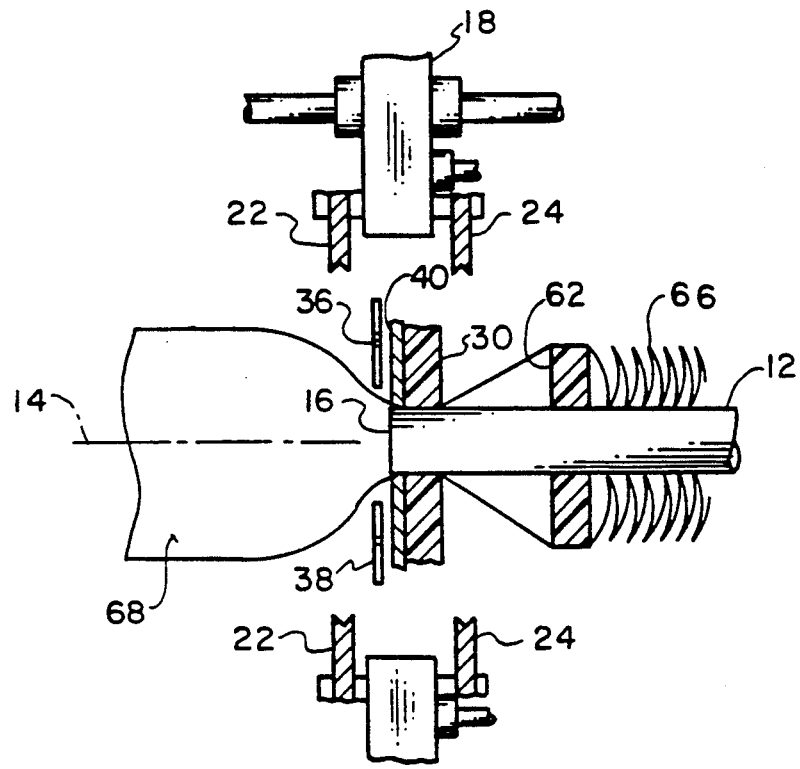
FIGS. 2-6 are schematic views showing a sequence of operation of the voider assembly.
Figure 3:
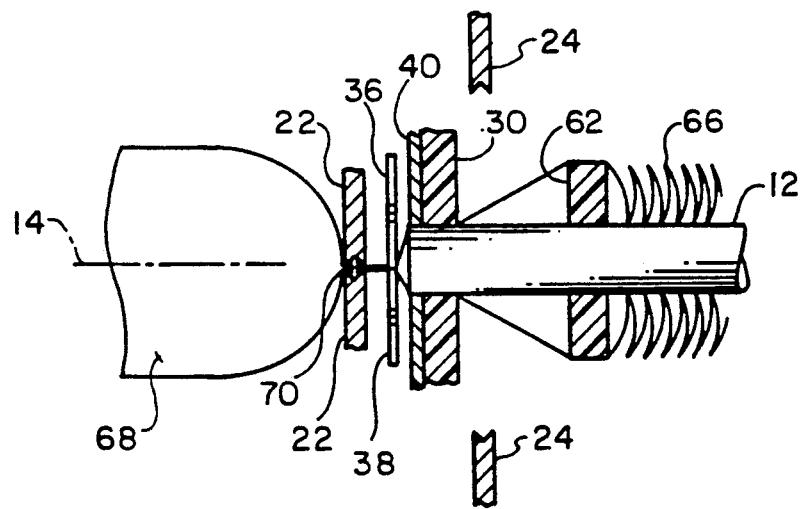

The sequence of operation of the present invention will be described with reference to FIGS. 2-6. FIG. 2 shows the relative arrangement of components during the course of stuffing a casing 66. This arrangement as shown in FIGS. 1 and 2 has the clipper carriage 18 positioned so one clipper 22 is disposed in a plane just forward of the stuffing horn discharge end 16 and the second clipper 24 is located aft of the discharge end. The snubbing carriage is positioned so its forward surface 40 is generally aligned with the discharge end 16 and the voider gates 36, 38 are located between the first clipping device 22 and the discharge end. With the components in this position, casing 66 which is drawn forward from the stuffing horn 12 and along the stuffing axis 14, is stuffed to produce an encased product, a portion of which is shown at 68.

After a desired length of casing is stuffed, the stuffing operation stops and the casing is closed to seal the end of the stuffed product. To accomplish this, clipper 22 closes about the stuffed product (FIG. 3) to gather the casing towards the stuffing axis 14 and apply a suitable closure, such as a metal clip 70. The voider gates 34, 36 also close toward the stuffing axis. This closing either slightly lags the closing of clipper 22, or is concurrent with the closing of the clipper. In either case, the clipper 22 exerts the force to gather the casing through the stuffed product 68 and the gates 36, 38 are not forced against the stuffed casing. Instead, the gates close against the gathered casing from which the food product is already substantially completely displaced by the closing of clipper 22. The relative longitudinal positions of the clipper 22 and the voider gates 34, 36 are such that the voider gates close about the gathered casing adjacent to and immediately aft of the clip closure 70.

Figure 4:
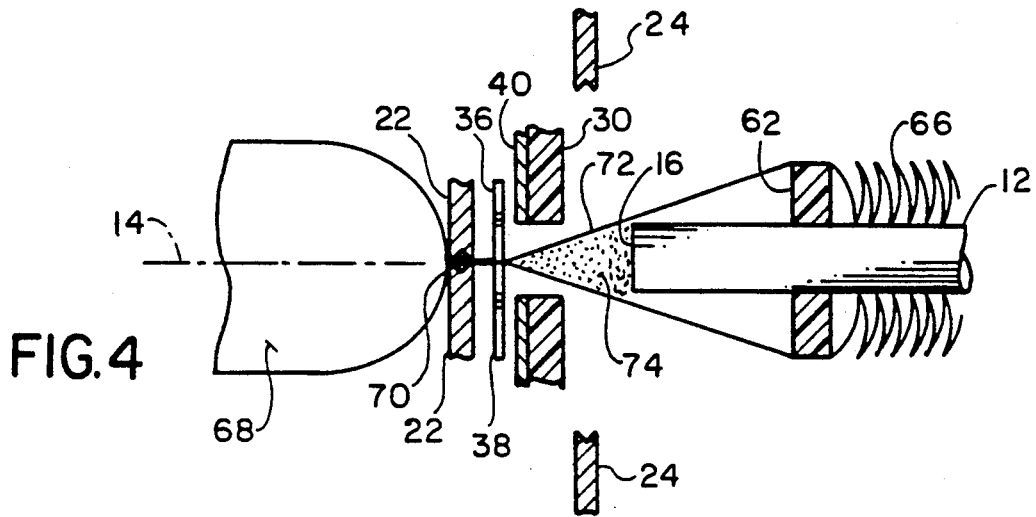

Clipper 22 and voider gates 36, 38 remain in the closed position while the clipper carriage 18 (FIG. 1) is indexed in a forward direction. This pushes the stuffed product 68 in a forward direction along the stuffing axis 14, as shown in FIG. 4. The forward movement of the clipper carriage continues until the second clipper device 24 is clear of the stuffing horn discharge end 16.

This forward movement pulls a length of casing from the casing supply. A portion of the casing length extending from the clip closure 70 back towards the stuffing horn is referred to hereafter as a "casing tail" 72. This casing tail usually contains some portion 74 of food product. For example, food product can ooze from the stuffing horn as the casing is pulled forward and food product also can be displaced into the casing tail from the closing action of the clipper device 22.

Should the second clipper device 24 operate at this point to apply a second closure to the casing, it is inevitable that some portion of the food product will be captured in the casing tail between the clip closure 70 and the closure applied by the clipper device 24. As noted hereinabove, this is objectionable because it could waste food product which otherwise can be used for stuffing into the food product made next after the encased product 68. If the casing between the closures is severed to separate one stuffed product from another, the food product in the casing tail is exposed. As noted above, the exposed food product is unsightly and subject to contamination. Also, during subsequent processing to cook or smoke the stuffed product, the exposed food product may drip from the severed casing tail and contaminate the processing equipment. Accordingly, it is preferred to eliminate as much food product from the casing tail as possible.

Figure 5:
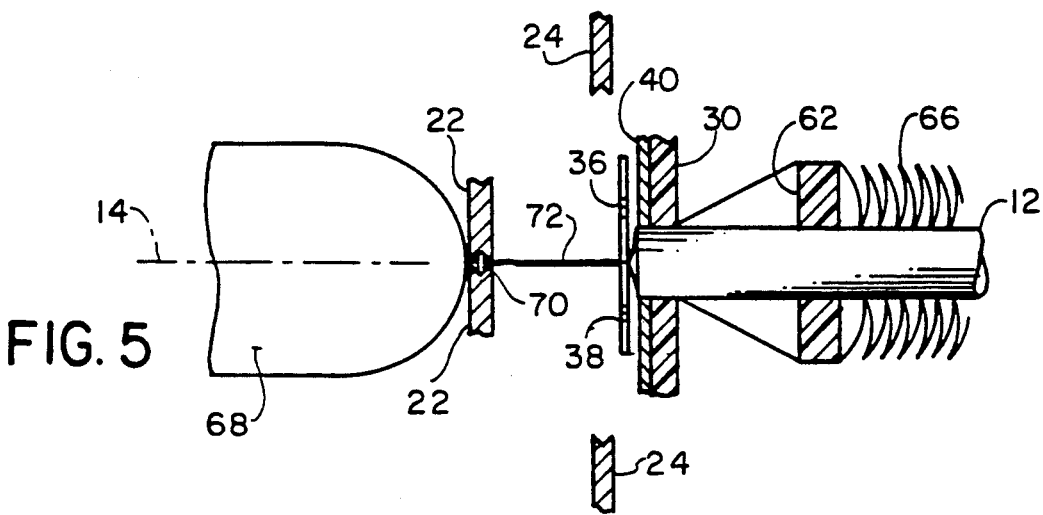
Figure 6:
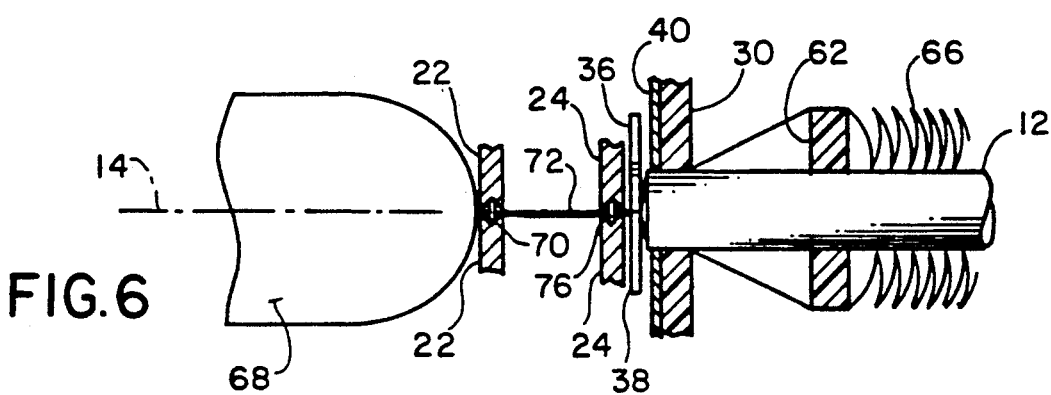

To eliminate this food product 74 from the casing tail 72, the pneumatic cylinders 28 (FIG. 1) are operated to move the snubber 26 in an aft direction with respect to the clipper carriage 18. In the course of this movement, the voider gates 36, 38 (which are closed about the casing adjacent clip 70) progressively constrict the casing tail 72 over its length to strip any food product from the tail. The aft movement of the snubber continues until the closed voider gates are beyond the plane of the second clipper 24 and are adjacent the stuffing horn discharge end 16. The result of this movement as shown in FIG. 5 is that any food product contained in the casing tail 72 is stripped from the tail and back towards and the stuffing horn. This leaves a casing tail 72 which is constricted for substantially its full length along the stuffing axis and which is substantially void of food product.

The second clipper device 24 can now operate to apply a second clip 76 (FIG. 6) to the constricted casing. A knife means (not shown) carried by the clipper carriage 18 (FIG. 1) now can be operated to sever the casing between the closures 70, 76 in a conventional manner.

To complete the operation, the clippers 22, 24 and the voider gates 36, 38 open, and the clipper carriage 18 and snubber 26 are returned to the positions as shown in FIG. 1.

FIGS. 7 and 8 show components of the voider assembly 34 in greater detail. For purposes of clarity, portions of the snubber 26 are not shown in these figures so that the voider gates 36, 38 (which are carried on the front surface 40 of the snubber), the linkages 54, 56 and cylinder 58 (which are carried on the rear surface 41 of the snubber) can all be shown in solid line.

FIG. 7 shows the voider gates 36, 38 in an open position. Rod 42, which is fixed to gate 36 extends back through the snubber 26 and is fixed to one end of a link 54. The other end of link 54 is pivotally connected to a second link 54a. Link 54a in turn is pivotally connected to a piston rod 78 driven by pneumatic cylinder 58. Pressurizing cylinder 58 so as to drive rod 78 in the direction of arrow 80 will pivot the links 54, 54a for swinging gate 36 to an open position as shown in FIG. 7. Driving rod 78 in the direction of arrow 82 as shown in FIG. 8, will pivot links 54, 54a from the dotted line position to the position shown in solid line for swinging gate 36 to a closed position.

In a similar fashion, rod 44 (fixed to gate 38) extends back through snubber 26 and is fixed to one end of link 56. The other end of link 56 in turn is pivotally connected to a second link 56a. This second link 56a pivotally connects to a third link 56b which in turns pivotally connects to the piston rod 78. Pressurizing cylinder 58 so as to drive rod in the direction of arrow 80 will pivot links 56, 56a and 56b for swinging gate 38 to the open position as shown in FIG. 7. Driving rod in the direction of arrow 82 as shown in FIG. 8 will pivot links 56, 56a, 56b from the dotted line position to the position shown in solid line for swinging gate 38 to a closed position.

Voider gates 36, 38 close in a scissor-like fashion and in the closed position the gates lap and leave an opening 84 coincident with the stuffing axis 14. The size of opening 84 can be adjusted depending upon the size and wall thickness of the casing to accommodate the resulting constricted casing tail. Such an adjustment can be made by changing the length of rod 78.

Thus, it should be appreciated that the present invention accomplishes its intended objects. A single pair of voider gates are used to progressively constrict and strip food product from a casing tail. Since the gates close concurrent, and preferably after the first clipper has operated, the gates are not forced against the stuffed casing and instead close about casing already gathered to the stuffing axis. This avoids possible casing damage resulting from forcibly pressing the relatively thin voider gates against a stuffed casing.

In the invention as described, the closing of voider gates 36, 38 either slightly lags the closing of clipper 22 or is concurrent with the closing of the clipper. In another arrangement, the closing of gates 36, 38 is delayed until after the carriage 18 and closed clipper 22 have moved the stuffed product 68 forward to the position shown in FIG. 4.

Having described the invention in detail, what is claimed as new is:

1. A method of gathering and closing stuffed casing comprising the steps of:
   a) providing a casing supply on a stuffing horn, said casing supply having a closed end;
   b) discharging a flowable food product under pressure from a discharge end of the stuffing horn into the casing thereby stuffing said casing and moving the closed end away from the stuffing horn;
   c) stopping the flow of food product after a predetermined length of casing has been stuffed;

d) gathering the stuffed casing towards its longitudinal axis at a location adjacent the discharge end of the stuffing horn and applying a first closure to the gathered casing;

e) advancing the stuffed casing in the direction of its longitudinal axis to space the first closure away from the discharge end of the stuffing horn thereby providing a casing tail which extends from the first closure to the stuffing horn and in which is present some portion of the food product;

f) closing opposed gates about the casing tail adjacent the first closure and moving the closed gates axially toward the stuffing horn and progressively constricting the casing tail over its length from the first closure to the discharge end of the stuffing horn thereby axially stripping the portion of food product from the casing tail back to the stuffing horn; and g) applying a second closure to the constricted casing tail at a position longitudinally spaced from the first closure.

2. A method as in claim 1 including closing said opposed gates concurrently with the casing gathering step (d).

3. A method as in claim 1 including closing said opposed gates after the casing gathering step (d).

4. A method as in claim 1 wherein closing said opposed gates occurs after said advancing step (e).

5. A method as in claim 1 including:
a) advancing the closed opposed gates together with the stuffed casing at step (e); and then
b) moving the closed opposed gates longitudinally back towards the stuffing horn discharge.

6. A method as in claim 1 wherein the first and second closures are applied respectively by longitudinally spaced first and second clippers and said advancing step (e) includes moving both clippers longitudinally with respect to the stuffing horn until said second clipper is spaced forward of the stuffing horn discharge end, and said progressively constricting step (f) terminates at a point between the second clipper and the stuffing horn discharge end.

7. Apparatus for gathering and closing stuffed casing comprising:
a) a stuffing horn arranged along a stuffing axis for stuffing a food product in a forward direction into casing disposed on the stuffing horn;
b) a first carriage arranged for movement in said forward direction and in an opposite aft direction along a path of travel parallel to the stuffing axis;
c) clipper means fixed to said first carriage including:
(i) a first clipper mechanism closable toward the stuffing axis for gathering the casing to the stuffing axis and applying a first closure to the gathered casing; and
(ii) a second clipper mechanism spaced longitudinally from said first mechanism in an aft direction along said stuffing axis;

d) a first drive means operable after the first clipper mechanism is closed about the stuffed casing for advancing said carriage in said forward direction and away from the discharge end of the stuffing horn to locate said first closure spaced forward of said stuffing horn and provide a food product containing casing tail extending from said first closure to said stuffing horn;

e) a voider assembly movable longitudinally with respect to said carriage along a path of travel parallel to said stuffing axis, said voider assembly including a single set of opposed gates disposed transverse the stuffing axis which are closable about the casing tail adjacent said first closure;

f) said voider assembly including drive means operable, after closing said opposed gates and advancing said carriage, to move said voider assembly in said aft direction and away from said carriage to a position between said second clipper mechanism and said stuffing horn discharge end so that said closed gates progressively constrict the casing tail over its length and strip the food product contents of said casing tail back to said stuffing horn; and g) said second clipper mechanism being operable after the movement of said voider assembly in said aft direction to apply a second closure to said constricted food product-stripped casing tail.

8. Apparatus as in claim 7 wherein said voider assembly is carried by said first carriage.

9. Apparatus as in claim 7 wherein said opposed gates are pivotally supported for swinging movement between an open and a closed position.

10. Apparatus as in claim 7 including:
a) a second carriage carried by and longitudinally movable with respect to said first carriage;
b) said voider assembly being on said second carriage and said gates being pivotally supported on a surface of second carriage facing in said forward direction for swinging movement between an open and a closed position;
c) rods fixed to each gate and journaled to said second carriage, said rods extending through said second carriage to a second surface thereof facing in said aft direction; and
d) said voider assembly drive means being carried on said aft facing second surface and operatively connected to said rods for turning said rods and swinging said gates between an open and a closed position.

* * * * *